June 10, 1941. E. SVOBODA 2,244,923
BOBSLED CONSTRUCTION
Filed Dec. 23, 1938 2 Sheets-Sheet 1
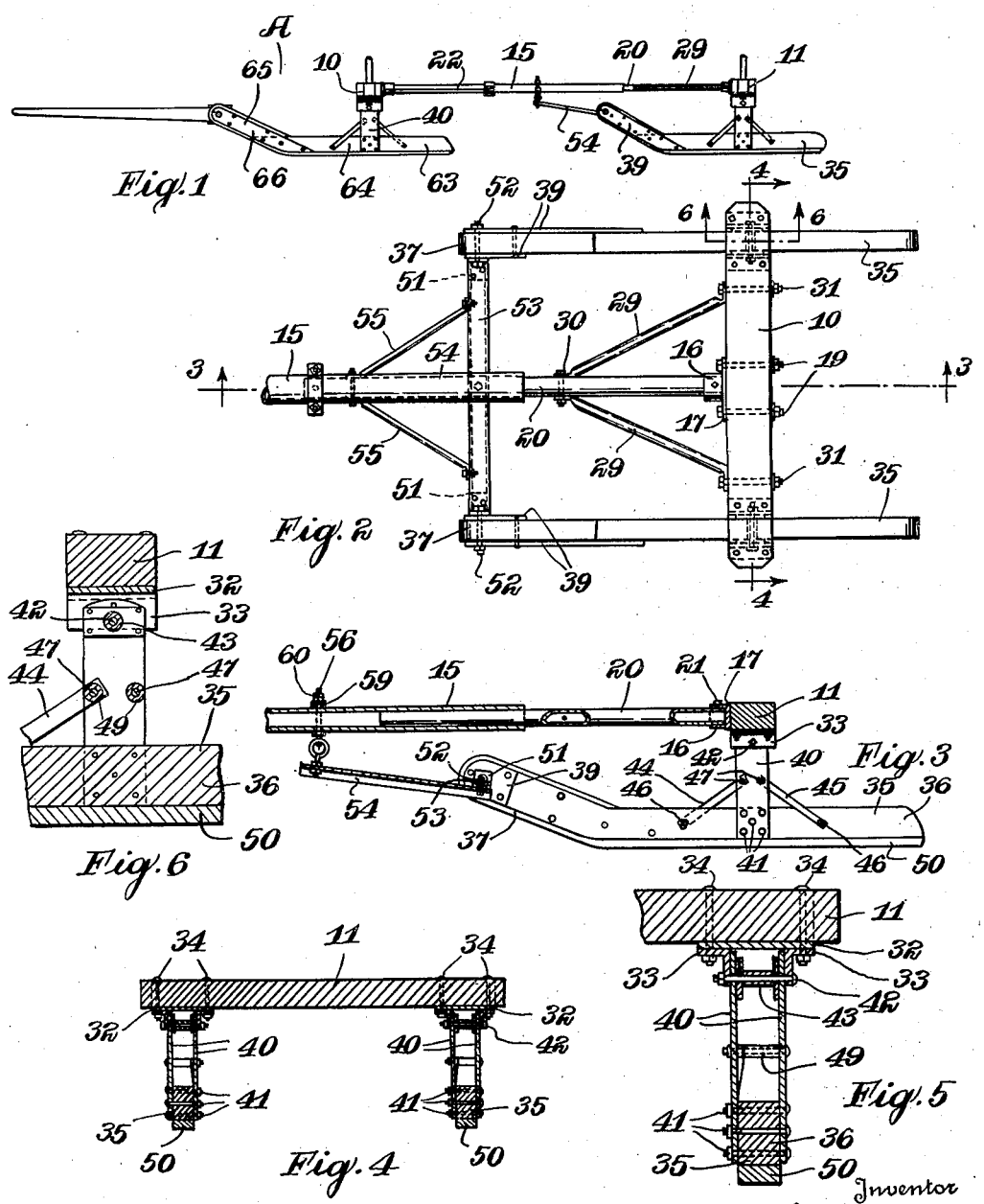
Inventor
Emil Svoboda
By Howard Fincher
Attorney June 10, 1941.   E. SVOBODA   2,244,923
BOBSLED CONSTRUCTION
Filed Dec. 23, 1938   2 Sheets-Sheet 2
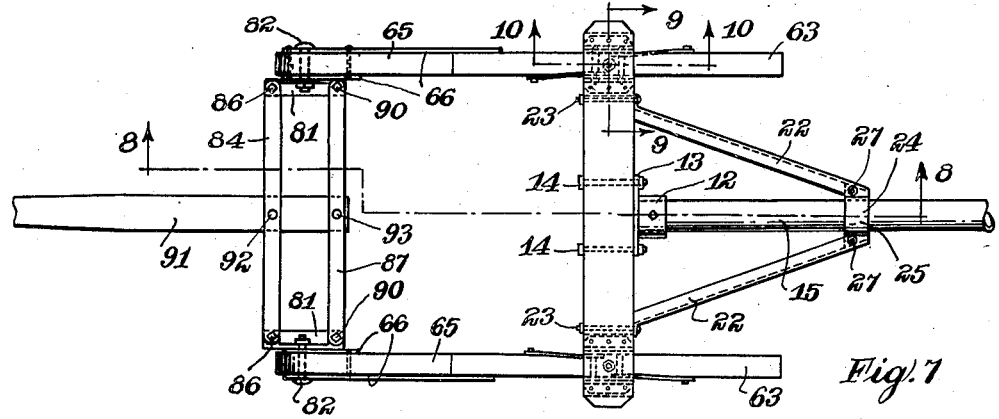
Fig. 7
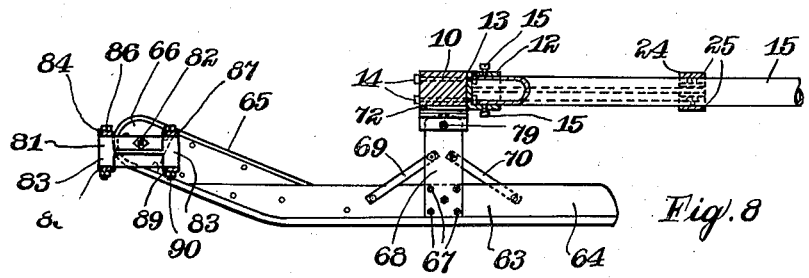
Fig. 8
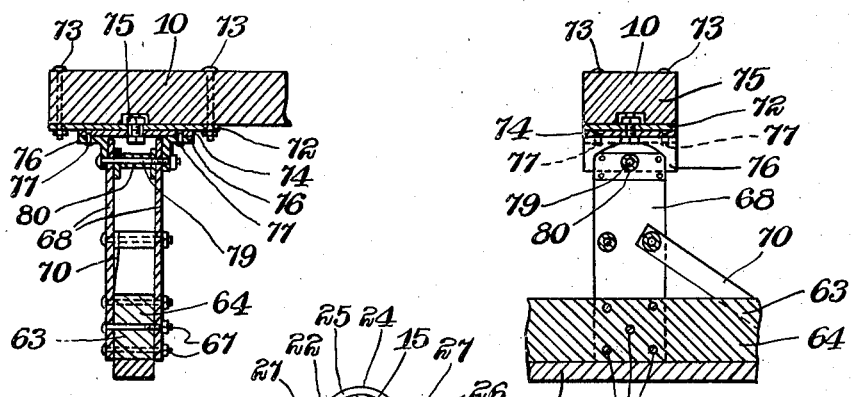
Fig. 9   Fig. 11   Fig. 10
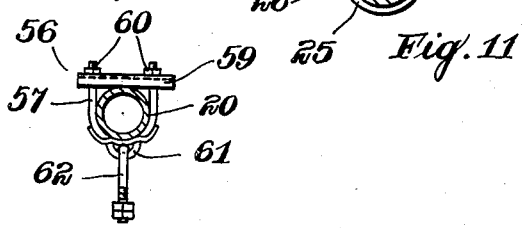
Fig. 12.
Inventor
Emil Svoboda
By
Attorney Patented June 10, 1941

2,244,923

UNITED STATES PATENT OFFICE 2,244,923

BOBSLED CONSTRUCTION

Emil Svoboda, Blooming Prairie, Minn.

Application December 23, 1938, Serial No. 247,357

5 Claims. (Cl. 280—15)

My invention relates to an improvement in bob sleds wherein it is desired to provide a sled in which desired flexibility is provided between the pairs of runners and between the pairs of runners and the body mounted thereon.

Bob sleds of various types have been constructed for a great number of years. In most of these sleds, the front runners are rigidly connected together in substantially parallel relationship, and the runners as a unit are pivoted about a point centrally between the runners. In turning the sled, the runners must move sideways a substantial distance, as the center of the pivotal movement is between the runners. Furthermore, it has been difficult to mount the runners in pairs so that one pair of runners may assume an angle with the horizontal so that one runner may pass over an irregularity in its path without straining the runner mounting. Furthermore, it has been the custom to mount the runners in pairs so that each pair of runners are rigidly connected as a unit, making pivotal movement of individual runners difficult.

It is the purpose of my invention to provide a bob sled in which the frame is provided with a front cross member which is provided at each end with a pivotal attachment with an individual runner. This pivotal attachment permits the runner to pivot along a transverse axis parallel the cross member, so that the front of the runner may swing up or down slightly to permit each runner to conform more readily with the contour of the ground. The pivotal attachment embodies a vertical pivot also, so that each runner may pivot about a center directly above the runner.

It is a further purpose of my invention to provide a bod sled in which the front runners are provided with vertically extending pivots, and in which the front or rear ends of the runners are provided with connecting links also connected at each end to the runners by a vertical pivot. The cross arm to which the runners are pivoted, and the connecting link means pivoted to the runners, remain parallel at all times, thereby continuously holding the front runners parallel; but the runners are permitted to pivot with respect to the cross arm to permit the sled to be turned.

It is a purpose of my invention to provide a sled having individually pivoted front runners which are held in parallel relationship, and also to provide a draw bar for the sled which is connected to parallel links pivotally connecting the runners. This draw bar is centrally pivoted to each of the parallel links in such a manner that movement of the draw bar to one side or to the other swings one parallel link to the right and the other to the left. This action pivots the runners about their pivotal mounting to steer the sled.

It is a further purpose of my invention to connect the ends of the links connecting the runners together to a longitudinally extending bracket which is pivoted to the runners along transverse pivots. This permits the brackets to pivot with respect to the runners, and allows the draw bar to be raised or lowered without affecting the steering of the sled.

It is another purpose of my invention to provide a sled having a front cross bar and a rear cross bar; runners mounted on the cross bars; and a means connecting the front and rear cross bars which permits rotation of the front runners with respect to the rear runners along a longitudinal axis. This I accomplish by providing a tubular member extending rearwardly from the front cross bar, and a tubular member extending forwardly from the rear cross bar, and telescopically arranging these tubular members. The rear cross bar is provided with braces which are connected to the tubular member on the rear cross member, while the front cross bar is provided with braces which connect with the front tubular member to keep the cross arms at right angles with the tubular members. One tubular member may pivot with respect to the other, thereby providing front and rear cross bars and runners which are relatively angularly adjustable.

These and other objects and novel features of my invention will be more clearly and fully set forth in the following specification and claims.

In the drawings forming a part of my invention:

Figure 1 is a side elevational view of a sled formed in accordance with the principles of my invention.

Figure 2 is a top plan view of the rear pair of runners and the connecting rear portion of the sled frame.

Figure 3 is a central section through the longitudinal axis of my sled, showing the rear portion thereof only, the section being indicated by the line 3—3 of Figure 2.

Figure 4 is a vertical transverse section through the rear cross member and runners, the section being indicated by the line 4—4 of Figure 2.

Figure 5 is an enlarged section showing in detail the manner of supporting one of the rear runners, the section being taken along a portion of the line 4—4 of Figure 2.

Figure 6 is an enlarged section through the rear cross arm and a portion of a rear runner, the position of the section being indicated by the line 6—6 of Figure 2.

Figure 7 is a top plan view of the front runners and the front portion of the frame connected thereto.

Figure 8 is a longitudinal section, the position of which is indicated by the line 8—8 of Figure 7 of the drawings.

Figure 9 is a transverse section through a portion of the front cross arm and through one front runner, in enlarged form, the section being taken on the line 9—9 of Figure 7.

Figure 10 is a longitudinal section through one end of the front cross arm and through a portion of a front runner, the position of the section being shown by the line 10—10 of Figure 7.

Figure 11 is a section through the front tubular member, showing the clamp to which the front cross arm braces are attached, and showing the braces in section.

Figure 12 is a section through the rear tubular member, showing the clamp to which the front ends of the rear runners are attached.

The bob sled A is provided with a front cross arm 10, and a rear cross arm 11. A socket 12 is provided with an attaching flange 13 which is secured to the rear side of the front cross arm 10 by means of bolts 14 or other suitable means. A tubular member 15 is secured in the socket 12 by set screws or other suitable means, and extends rearwardly from the front cross arm 10.

The rear cross arm 11 is provided with a socket 16 having a flange 17 thereon attached to the front side of the rear cross arm 11 by means of bolts 19 or other suitable means. A tubular member 20 is secured in the socket 16 by set screws 21 or other suitable means. The tubular member 15 is of larger diameter than the tubular member 20, and these tubular members are arranged in telescoping relationship.

A pair of angle iron braces 22 are attached to the front cross arm by means of bolts 23 or other suitable attaching means, and are secured at their other ends to a clamp 24. As may be best seen in Figures 7 and 11 of the drawings, the clamp 24 is formed of a pair of arcuated members 25 each having end ears 26 at either end thereof. Bolts 27 extend through the ears 26 of the arcuated members 25, and through the braces 22. These bolts clamp the arcuated members 25 unto the tubular member 15, and secure the braces 22 to the clamp 24.

The rear cross arm 11 is provided with a pair of braces 29 having flattened ends. One end of each of the braces 29 is secured to the tubular member 20 by means of a bolt 30 which extends through the tubular member. The other end of each of the braces 29 is secured to the cross member 11 in any suitable manner, such as by bolts 31. The braces 22 and 29 hold the cross arms 10 and 11 at right angles to the tubular members 15 and 20 respectively.

With special reference now to Figures 2 through 6 of the drawings, it will be noted that a heavy metal plate 32 underlies each end of the rear cross arm 11. To the under surface of each plate 32 is secured a pair of parallel angle members 33, arranged in spaced relationship. The plates 32 and angles 33 are secured to the cross arm 11 by means of bolts 34 or other suitable means.

Each of the rear runners 35 are formed of a relatively long, deep wooden member quite narrow in width, and indicated in the drawings by numeral 36. An upwardly extending front end member 37 is provided, and side plates 39 reinforce the forward ends of the runners. A pair of opposed plates 40 project upwardly from the runners 35, and are secured thereto, as by bolts 41. These plates 40 are rounded somewhat on top; and bolts or pins 42 extend through the angles 33 and through the upper extremities of the plates 40 which extend between the angles 33. Tubular spacing members 43 are provided on the pivot bolts or pins 42 between the plates 40 to hold these plates in spaced relationship.

A pair of braces 44 and 45 connect the plates 40 with the runners 35. The brace 44 extends forwardly from the plates 40 and is bolted by bolt 46 to the runner. The brace 45 extends rearwardly from the plates 40 and is secured by bolt 46 to the rear portion of the runner. The braces are secured to the plates 40 by means of bolts 47. Spacers 49 fill the space between the brace and one plate 40, holding the brace against the opposite plate 40.

The runners 35 are provided with a metal strip 50 which extends from the rear end of the runner, beneath the lower surface of the wooden member 36, and up over the upwardly extending front end member 37.

An angle bracket 51 is pivotally connected to the front end of each runner 35 by means of the transversely extending bolts 52. These angle brackets are on the inner sides of the runners 35, and are connected by means of a connecting channel link 53 which is riveted or welded to the angle brackets 51. To the center of the connecting link 53 is secured a forwardly extending channel member 54. Braces 55 connect the channel member 54 to the transverse channel 53, and hold the member 54 at substantially right angles to the transverse connecting member 53.

A bracket 56 clamps about the tubular member 15, and acts to connect the tubular member 15 with the forwardly extending channel tongue 54. The bracket 56 includes a substantially U-shaped bolt 57 surrounding the tubular member and extending through a clamping bar 59. When the nuts 60 on the U-bolt 57 are tightened, the bracket is held firmly in place. The U-bolt is provided with a central loop portion 61 to accommodate the eye-bolt 62. The eye-bolt 62 extends through the front end of the forwardly extending channel tongue 54. Thus a flexible connection is provided between the tubular member 15 and the forwardly extending tongue 54, permitting the runners to raise or lower somewhat at the front. The bracket 56 is best illustrated in Figure 12 of the drawings.

With reference now to Figures 7 through 10 of the drawings, it will be noted that the front runners 63 are virtually identical in formation with the rear runners 35. The front runners are formed of a runner body 64 having an upwardly slanting front end 65. A pair of plates 68 are oppositely disposed on either side of the runner body 64, and project upwardly from the runners, being secured thereto as by the bolts 67. Braces 69 and 70, similar to the braces 44 and 45, connect the plates 68 and the runner body 64. A metal strip 71 extends beneath the runner body, and up over the upwardly slanting front end of the runners to increase the wearing life of the runners.

A heavy metal plate 72 is secured to the under surface of each end of the front cross arm 10 as by bolts 73. A second plate 74 is pivotally secured to each plate 72 by means of a pivot pin or bolt 75. A pair of spaced, parallel angle members 76 are secured to the plate 74 by means of rivets 77 or other suitable means. These angle members 76 are spaced sufficiently to permit the upper extremities of the plates 70 to be interposed therebetween.

The upper ends of the plates are rounded as shown in Figure 10 of the drawings. A pivot bolt or pin 79 extends through the angle members 76 and through the upper extremities of the plates 70. A spacer 80 extends between the plates 70 surrounding the bolt 79 to hold the plates spaced to the proper extent.

2—Night Pats—M. W. DOWNS—May 29—24836

From the foregoing description, it will be apparent that the runners 63 are free to swing to some extent about the transverse pivots 79, and may also pivot about the vertically extending pivot 75. In order that the sled A may steer properly, the runners are maintained in parallel relationship by a linkage which will now be described.

A longitudinally extending bracket 81 is secured overlying a portion of the inside surface at the front end of each runner 63, and is pivoted to the runner by means of a pivot bolt 82. The bracket 81 includes a pair of parallel, substantially vertical journals 83. A pair of upper and lower links 84 and 85 are connected by pivot bolts 86 to the front end of the bracket 81. The upper link 84 extends on top of the bracket 81, while the lower link 85 extends beneath the bracket, and both are secured pivotally by the same two bolts 86. A second pair of links including an upper link 87 and a lower link 89 are pivoted at each end by pivot bolts 90 to the rear end of the bracket 81. These pairs of links are all of equal length, and are equal in length to the distance between the vertical pivot bolts 75, and therefore the runners 63 remain parallel regardless of the pivotal position of the same, and the links also remain parallel.

A draw bar 91 extends between the top and bottom links of each pair, and are pivoted to each pair of links. A bolt or pivot pin 92 extends through the link 84, through the draw bar 91, and through the link 85. A second bolt 93 extends through the link 87, through the draw bar 91, and through the link 89.

As will be seen from an observation of Figure 7 of the drawings, movement of the draw bar downwardly or to the left facing the front of the sled will move the first pair of links 84—85 to the left, and the second pair of links 87—89 to the right, swinging the runners 63 to turn the sled to the left.

Similarly, of course, movement of the draw bar in the opposite direction will turn the front runners 63 in a manner to turn the sled A in that direction.

In accordance with the patent statutes, I have described the principles of operation and construction of my bob sled; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A bob sled including a cross member, a pair of spaced runners secured to opposite ends of said cross member, a vertical pivot connecting each of said runners to said cross member, a longitudinally extending bracket pivotally connected to each runner by means of a transverse pivot, a link pivotally connected to one end of each of said brackets, and a second link pivoted to the other end of each of said brackets.

2. A bob sled including a cross member, spaced runners vertically pivotally connected to said cross member, a bracket transversely pivoted to each of said runners, links pivotally connected to each end of said bracket, and a draw bar centrally pivoted to said links.

3. In a bob sled, a frame, a pair of rear runners secured thereto, a front cross arm, a pair of front runners, vertical pivots connecting said front runners to said cross arm, a draw bar, a pair of spaced link means terminally pivoted to said front runners and connecting said front runners to hold the same in substantially parallel relationship, and means pivotally connecting one end of said draw bar to said pair of spaced link connecting means holding said draw bar continuously in all angular positions of said front runners in a vertical plane parallel to said front runners.

4. In a bob sled, a frame, a pair of rear runners secured thereto, a front cross arm, a pair of front runners secured thereto, a substantially vertical pivot connecting each front runner to said cross arm, a pair of longitudinally spaced tie rod means connecting said runners to hold the same in parallel relationship, a draw bar, means pivotally connecting said pair of spaced tie rod means and said draw bar to maintain said draw bar on a plane parallel to said front runners in all angular positions of said front runners, and means transversely pivotally connecting said tie rod means to said front runners to support said draw bar pivotally on a vertical plane.

5. A bob sled including a pair of runners, a pair of bars spaced longitudinally of the runners extending transversely between the forward ends of said runners, a bearing plate adjacent each runner secured at right angles to the corresponding ends of said bars, aligned pivots through said plates and said runners to pivotally secure the ends of said bars to said runners, and means holding said runners parallel.

EMIL SVOBODA.